(12) United States Patent
Shepodd et al.

(10) Patent No.: US 7,052,608 B2
(45) Date of Patent: May 30, 2006

(54) CAST-TO-SHAPE ELECTROKINETIC TRAPPING MEDIUM

(75) Inventors: Timothy J. Shepodd, Livermore, CA (US); Elizabeth Franklin, Rolla, MO (US); Zane T. Prickett, Golden, CO (US); Alexander Artau, Pleasanton, CA (US)

(73) Assignee: Sandia National Laboratories, Livermore, CA (US)

( * ) Notice: Subject to any disclaimer, the term of this patent is extended or adjusted under 35 U.S.C. 154(b) by 236 days.

(21) Appl. No.: 10/841,393

(22) Filed: May 7, 2004

(65) Prior Publication Data

US 2004/0251205 A1 Dec. 16, 2004

Related U.S. Application Data

(62) Division of application No. 10/213,842, filed on Aug. 7, 2002, now Pat. No. 6,770,201.

(51) Int. Cl.
*B01D 15/08* (2006.01)
(52) U.S. Cl. ............... 210/635; 210/656; 210/198.2; 210/502.1; 204/455; 521/63
(58) Field of Classification Search ............. 210/635, 210/656, 659, 502.1, 198.2; 95/82, 88; 96/101; 521/63; 204/451, 455, 456
See application file for complete search history.

(56) References Cited

U.S. PATENT DOCUMENTS 6,136,187 A 10/2000 Zare et al. ............... 210/198.2
6,472,443 B1 * 10/2002 Shepodd ..................... 521/63
6,616,825 B1 * 9/2003 Frechet et al. ............. 204/605

OTHER PUBLICATIONS

Quirino, J. P. et al., "Strategy for on-line Preconcentration in Chromatographic Separations", Anal. Chem., 73, 5539, Nov. 15, 2001.
Quirino, J. P. et al., "On-line Preconcentration in Capillary Electrochromatography Using a Porous Monolith together with Solvent Gradient and Sample Stacking", Anal. Chem., 73, 5557, Nov. 15, 2001.
Dulay, M. T. et al., "Photopolymerization Sol-gel Monoliths for Capillary Electrochromatography", Anal. Chem., 73, 3921, Aug. 15, 2001.

* cited by examiner

*Primary Examiner*—Ernest G. Therkorn
(74) *Attorney, Agent, or Firm*—Donald A. Nissen

(57) ABSTRACT

A three-dimensional microporous polymer network material, or monolith, cast-to-shape in a microchannel. The polymer monolith, produced by a phase separation process, is capable of trapping and retaining charged protein species from a mixture of charged and uncharged species under the influence of an applied electric field. The retained charged protein species are released from the porous polymer monolith by a pressure driven flow in the substantial absence of the electric field. The pressure driven flow is independent of direction and thus neither means to reverse fluid flow nor a multi-directional flow field is required, a single flow through the porous polymer monolith can be employed, in contrast to prior art systems. The monolithic polymer material produced by the invention can function as a chromatographic medium. Moreover, by virtue of its ability to retain charged protein species and quantitatively release the retained species the porous polymer monolith can serve as a means for concentrating charged protein species from, for example, a dilute solution.

13 Claims, 3 Drawing Sheets

Electrochromatogram of α-Lactalbumin (0.1 mg/mL). Voltage = 10kV, Current = 4.2 A, Detection = 580 nm, Buffer = 70%, 20 mM borate, pH 8.1, 30% Acetonitrile, 10-second injection.

Chromatogram of α-Lactalbumin (0.1 mg/mL). Pressure = 1775 psi, Detection = 580 nm, Buffer = 70%, 20 mM borate, pH 8.0, 30% Acetonitrile, 10-second injection.

CAST-TO-SHAPE ELECTROKINETIC TRAPPING MEDIUM

CROSS-REFERENCE TO RELATED APPLICATIONS

This application is a division of prior application Ser. No. 10/213,842 filed a Aug. 7, 2002 now U.S. Pat. No. 6,770,201 from which benefit is claimed.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention is directed generally to a porous polymer medium, produced by photopolymerization, for separating and concentrating charged protein species from a carrier fluid that can contain both charged and uncharged species.

BACKGROUND OF THE INVENTION

It is frequently the case that it is desired to analyze molecular species, and charged protein species in particular, that are present in very low concentration either because the sample itself is very small or dilute or because the species of interest is present as a consequence of prior chemical processing and is thus at very low concentration. Moreover, these molecular species can be charged and being in the presence of uncharged molecules present further difficulty in analysis or separation.

Prior art provides a plurality of methods for concentrating molecular species from solution. However, there are numerous problems associated with these prior methods, such as the need for specialized column packing, the need for specialized solvents or buffer solutions, the need to change solvents or buffer solutions in order to elute concentrated molecular species, the need to change flow direction or flow conditions between the steps of retaining and eluting species, and the inability to either separate charged and uncharged molecular species or effect an efficient separation.

Zare et al. (*Anal. Chem.*, 73, 3921–3926, 5539–5543, 5557–5563, November 2001) describe porous sol-gel monoliths that overcome some of the problems inherent in prior art column packing materials. These monoliths, useful for capillary electrochromatography, wherein neutral species are to be separated, can be prepared by a one-step process but their pore structure is uncontrolled.

Palm et al., Anal. Chem., 69, 4499–4507, 1997, have described a one-step process for in situ preparation of macroporous polyacrylamide gel matrices for capillary electrochromatography that can be purged by the use of electroosmotic flow (EOF). While the solvent can be purged from these formulations by the use of EOF, the gel matrices have limited structural stability in useful chromatographic solvents such as acetonitrile. Moreover, polyacrylamide gels are highly swelled gels of low polymer content that rely on the solvent for their structure. Thus, these gels suffer from the draw back that they cannot be dehydrated without losing their structure.

A method for separating and concentrating charged species from uncharged or neutral species regardless of size differential has been disclosed by Singh et al. in U.S. patent application Ser. No. 09/256,586 entitled Electrokinetic Concentration of Charged Molecules, incorporated herein in its entirety. The method uses reversible electric field induced retention of charged species, that can include molecules and molecular aggregates such as dimers, polymers, multimers, colloids, micelles, and liposomes, in volumes and on surfaces of porous materials. The retained charged species are subsequently quantitatively removed from the porous material by a pressure driven flow that passes through the retention volume and is independent of direction thus, a multi-directional flow field is not required. Uncharged species pass through the system unimpeded thus effecting a complete separation of charged and uncharged species and making possible concentration factors greater than 1000-fold.

Singh et al. have found that the phenomenon of retention or trapping of charged molecules under the influence of an electric field occurs neither in an open capillary or channel nor in a capillary or channel packed with a stationary phase consisting of nonporous silica or polymer particles having a diameter of 1 µm or larger. Consequently, the porous stationary phase in Singh et al. has certain required properties. First, it must be capable of supporting electroosmotic flow. Second, the porous particulate material must have certain physical characteristics in order to effectively trap and retain charged particles. Silica particles having a diameter of about 1.5 to 20 µm and containing pores having a diameter of about 50 to 500 Å are preferred as a stationary phase material and silica particles having a diameter of about 5 µm and containing pores having a diameter of about 300 Å are particularly preferred.

While a porous particulate stationary phase has been shown to effectively trap and retain charged particles, these stationary phases are very difficult to fabricate, particularly in microchannels. In particular, the need to retain the particulate materials within the chromatography column requires fabrication of porous frits of controlled pore size over a significant length and high mechanical stability. This requirement presents a significant challenge to the use of a porous particulate stationary phase for separation of charged from uncharged species.

SUMMARY OF THE INVENTION

Accordingly, the present invention is directed to a three-dimensional microporous polymer network material, or monolith, that can be cast-to-shape in a microchannel. The polymer monolith is fabricated with structural characteristics that provide the capability for trapping and retaining charged protein species from a mixture of charged and uncharged species under the influence of an electric field. The retained charged particles are released by application of a pressure gradient in the substantial absence of an electric field.

Application of an axial voltage differential to a solution in contact with column or microchannel containing a stationary phase, wherein the stationary phase is the porous polymer monolith of the present invention, causes the solution, that can contain both charged and uncharged protein species to move through the column under the influence of electrophoretic and/or electroosmotic forces. Neutral or uncharged species contained in the solution completely traverse the length of the column while the charged protein species, that can be smaller or bigger than the neutral species, are retained on the porous polymer monolith. Retention or trapping of charged species only occurs in the presence of a porous stationary phase and while an electric field is applied along the solution flow path.

Charged protein species retained on the porous polymer monolith are removed by application of a pressure differential to the packed column. While it is preferred that the pressure differential be applied in the substantial absence of an electric field, it has been found that by adjusting the relationship between applied pressure and voltage such that the pressure-driven flow is significantly greater than the electric field induced transport, the charged protein species can be eluted from the porous stationary phase while a voltage is being applied to the column. Further, the pressure-driven flow that removes the retained charged species from the porous matrix is independent of direction and thus neither means to reverse fluid flow nor a multi-directional flow field is required. Consequently, a single flow through the porous polymer monolith can be employed to separate charged from uncharged protein species in contrast to prior art systems.

The polymer monolith is produced by a phase separation process. Phase separation occurs during polymerization of a monomer or monomer mixture dissolved in a solvent yielding a polymer-rich and a solvent-rich phase. The solvent-rich phase produces the micropores through which liquids flow during a separation. The parameters of the phase separation process are established such that the solvent-rich phase forms a majority of pores in the range of about 200 nm–10 μm. The lower limit (≈200 nm) is established to provide efficient hydrodynamic flow of a liquid phase during either pressure-driven or electric field-driven flow. The upper limit (≈10 μm) must be small enough for interaction by diffusion between mobile and stationary phases. The polymer-rich phase becomes a porous monolithic backbone that is formulated to contain a substantial portion of an alkoxy-substituted metal, such as Si, Ti, or Zr, as a protected functionality. Hydrolysis of the alkoxy functionality provides the charged groups necessary for electric field-driven flow. Consequently, at least about 20 vol % of the monomers contain an alkoxy protected metal functionality.

Extensive crosslinking allows the porous polymer monoliths to achieve high molecular weights and, in contrast to prior art porous polymer materials, imparts a high structural stability such that the polymer monolith resists swelling and/or dissolution in the presence of a wide variety of solvents and during subsequent hydrolysis. In the present invention at least about 20 vol % of the monomer is present as a crosslinker in order to provide a rigid matrix such that hydrolysis of the alkoxymetal functionality will not collapse the structure. If the monolith is to be employed as a separations medium in reverse phase chromatography applications, it is desirable to have at least about 25 vol % of the monomer containing a hydrophobic group such as alkyl, aryl, or substituted versions thereof.

Polymerization is initiated by adding a polymerization initiator and exposing the solvent/monomer solution to radiation whose wavelength is matched to the absorbance of the free radical polymerization initiator. Following the phase separation step and after the three-dimensional polymer structure has been established, the alkoxy protecting groups are hydrolyzed. This converts a portion of the monomer to a porous metal oxide structure that cannot collapse despite the large localized loss of mass because the bulk structure of the monolith has been defined by the initial crosslinked vinyl polymerization step. In this way, the polymer of the invention differentiates from sol/gel produced polymer materials. The charge on the metal oxide, and consequently the zeta potential, is controlled by pH, i.e., silica is negative at pH≧4 and titania is positive at pH≦6. After hydrolysis, the solution remaining in the pores of the monolith is exchanged for an appropriate running buffer.

In addition to separating charged from uncharged protein species, the monolithic polymer material produced by the invention has been found to function as a chromatographic medium. The inventors have found that when a plurality of retained charged protein analytes are eluted from the polymer stationary phase by application of a pressure gradient, a chromatographic peak relating to each of the plurality may be observed.

DETAILED DESCRIPTION OF THE INVENTION

Figure 1:
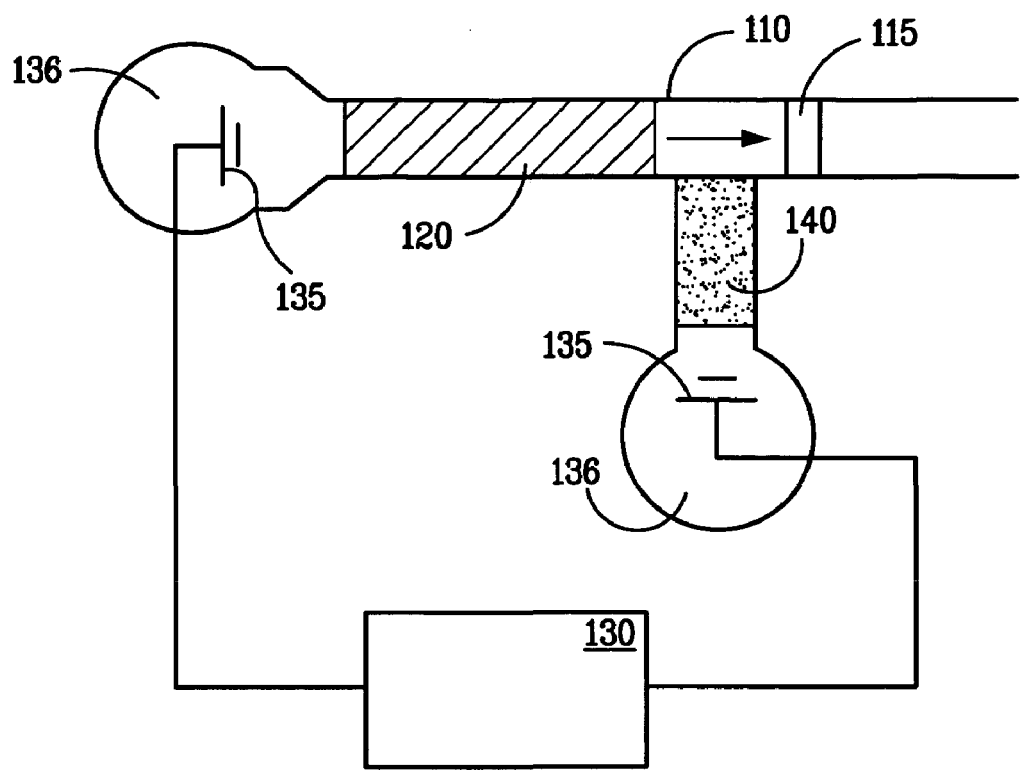
FIG. 1 shows a schematic representation of a separation column.

The invention will be illustrated by the following examples that illustrate generally methods for pretreating capillary or microchannel walls, for preparing monolithic polymer materials within capillaries and microchannels, wherein the monolithic polymer material is capable of retaining charged protein species under the influence of an electric field, and for the use of these monolithic materials in systems for chromatographic separations of mixtures of charged and uncharged protein species. The purpose of the pretreatment step is to functionalize the silica wall of the capillary so that the polymer monolith will be covalently bound to the capillary wall.

These examples only serve to illustrate the invention and are not intended to be limiting. Modifications and variations may become apparent to those skilled in the art, however, these modifications and variations come within the scope of the appended claims. Only the scope and content of the claims limit the invention.

Throughout the written description of the invention the terms channel and microchannel will be used interchangeably and may or may not be synonymous depending upon the context. The term "protein" means any group of complex organic compounds consisting essentially of combinations of amino acids in peptide linkages, that contain carbon, hydrogen, oxygen, nitrogen, and usually sulfur (Dictionary of Science and Technology, 1992).

While the invention will be described and illustrated by means of a capillary tube or microchannel, it is understood that the capillary tube or microchannel themselves can be part of a microfluidic device. The microfluidic device can be comprised of channels, reservoirs, and arbitrarily shaped cavities that are generally fabricated on the micron or submicron scale, e.g., having at least one cross-sectional dimension in the range from about 0.1 μm to about 500 μm, using any of a number of art recognized microfabrication methods, including injection molding, hot embossing, wet or dry etching, or deposition over a sacrificial layer. The microfluidic device can also include holes and/or ports and/or connectors to adapt the microfluidic channels and reservoirs to external fluid handling devices.

EXAMPLE 1

Prior to filling a capillary tube with a monomer solution the walls of the capillary were pretreated. Pretreatment involved injecting a solution comprising $H_2O$ (50 vol %), acetic acid (30 vol %), and Z-6030 (20 vol %) (Z-6030 is the tradename of an adhesion promoter obtained from Dow Chemical), into the capillary. The pretreatment solution remained in contact with the capillary walls for at least one hour and was washed from the capillary, preferably with a solution of 1 mM sodium acetate (80 vol %) in 1-propanol (20 vol %).

A monomer mixture was made by mixing together lauryl acrylate (16 vol %), 1,6-hexanediol diacrylate (10 vol %), and 3-(trimethoxysilyl)propylacrylate (silyl acrylate—12 vol %). A solution was prepared by adding a solvent mixture comprising 2-methoxyethanol (about 43 vol %), acetonitrile (about 11 vol %), and a 6.8 pH phosphate buffer (about 8 vol %) to the monomer mixture. Prior to injecting the solution into the capillary tube about 0.2 vol % of a polymerization initiator (azobisisobutryonitrile) and about 0.1 vol % of an inhibitor (hydroquinone) was added to the solution. The monomer solution was injected into the capillary tube by applying pressure to the monomer solution by a syringe. However, any means of applying an injection pressure could be used such as a high pressure pump or by applying a pressure differential between the inlet and outlet of the capillary tube.

A photomask was made by threading the capillary tube through a length of polyether ether ketone (PEEK) tubing and cutting away a portion-of the PEEK tubing so as to expose all or a portion of the solution to polymerizing radiation. The length of the resulting polymer monolith was determined by the length of PEEK tubing removed. In order to improve resolution between irradiated and unirradiated areas, i.e., to better define the ends of the polymer monolith, a polymerization inhibitor, e.g., hydroquinone was added to the solution. Polymerization of the monomer mixture was initiated by exposure to UV radiation having a wavelength of greater than about 365 nm for about 30 minutes, corresponding to a total energy input of about 14 $J/cm^2$.

After polymerization was complete, the remaining solution was exchanged from the pores of the polymer monolith by washing or purging with an acetic acid purging buffer (0.35 mM acetic acid in 50% acetonitrile) whose purpose was to hydrolyze the alkoxymetal protecting groups to form a metal oxide. The purging buffer remained in contact with the polymer monolith for at least about 3 hours to ensure completion of the hydrolysis reaction. The purging buffer was exchanged for a running buffer of tris-hydroxymethylaminomethane (Tris) by EOF at 1–5 kV.

FIG. 1 illustrates a system that can be used for the separation of charged species from uncharged species. A fused silica capillary column 110 having an internal diameter of about 100 μm had a porous polymer monolith 120, prepared as described above, disposed along a portion of its length. The capillary column was conditioned by perfusion with 20 mM Tris buffer at a pH of about 8.3, although other suitable buffer materials can be used. This step was accomplished by applying a voltage of about 1–5 kV to the porous polymer monolith by means of power supply 130 and electrodes 135. The electrodes were disposed on either side of stationary phase 120 and preferably in reservoirs such as 136. Progress of this experiment was monitored by addition of a detection window 115 downstream from the porous stationary phase, and the presence of the eluted molecules as they passed the detection window detected by laser induced dispersed fluorescence. An ultra microporous material 140 can be interposed between the electrodes and the capillary column. The ultra micro-porous material carries the current and thus, provides for fluid communication between the capillary column and the electrodes. However, the pores are sufficiently fine that pressure-driven or electro-osmotic flow is negligible.

Figure 2:
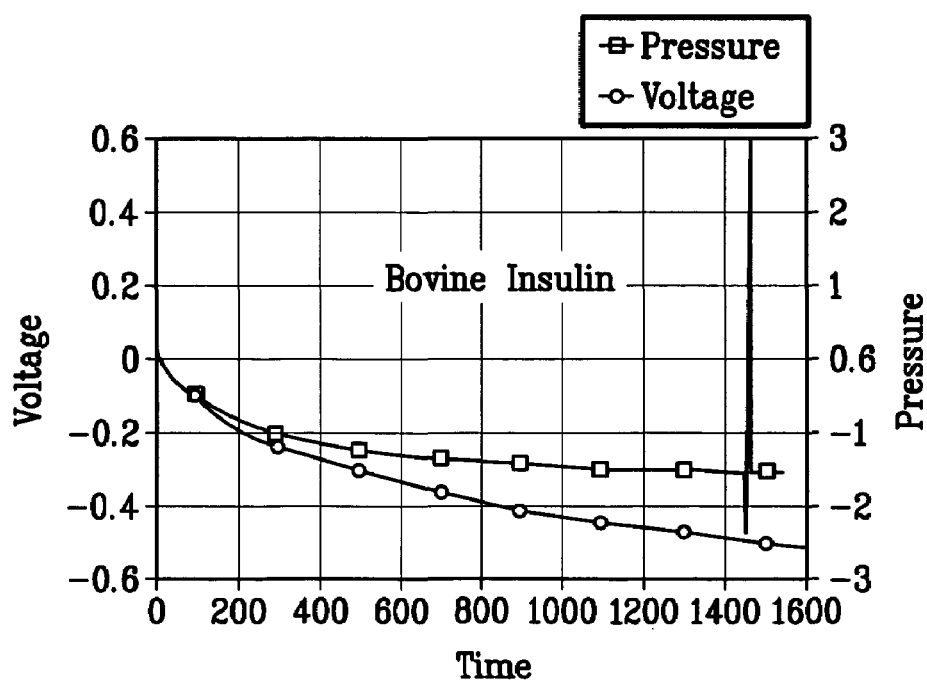
FIG. 2 is a chromatograph of bovine insulin taken during voltage and pressure induced flow.

A solution of bovine pancreatic insulin (0.1 mg/mL dissolved in a mixture of 1 mM NaOH and Tris buffer), a negatively charged protein, was injected onto a capillary column that had a porous polymer monolith, prepared as described above, disposed therein. A voltage of about 7.5 kV was applied to the column for about 25 min. Referring now to FIG. 2, no bovine pancreatic insulin was eluted from the capillary column during the 25 min. that the electric field was applied to the column. Subsequently, the electric field was decreased and constant pressure of about 1800 psi was applied to the capillary column by a pressure means such as a HPLC pump or other means designed to produce a hydraulic pressure. After about 25 min. a peak representing the bovine pancreatic insulin eluted from the column was detected.

EXAMPLE 2

A fused silica capillary tube having an internal diameter of about 100 μm was pretreated with a pretreatment solution comprising deionized $H_2O$ (50 vol %), glacial acetic acid (30 vol %), and 3-(trimethoxysilyl)propylacrylate (20 vol %) for about 12 hrs. The pretreatment solution was removed by rinsing with a solution of 1 mM sodium acetate (80 vol %) and 1-propanol (20 vol %). After air drying, a monomer reagent mixture was injected into the capillary.

As above, a photomask was provided by threading the capillary tube through a length of PEEK tubing and cutting away a section of the PEEK tubing to permit exposure of all or a portion of the monomer mixture to UV radiation.

A monomer mixture comprising a hydrophobic monomer, such as lauryl acrylate (16 vol %), a crosslinker, such as 1,6-hexanediol diacrylate (10 vol %), and a hydrolyzable monomer, such as 3-(trimethoxysilyl)propyl acrylate (12 vol %) was dissolved in a solvent comprising 2-methoxyethanol (43 vol %), acetonitrile (11 vol %), and 10 mM phosphate (pH 6.8) (7 vol %). Prior to injecting the monomer solution into the capillary tube about 0.3 wt % of a polymerization initiator (azobisisobutyronitrile) was added to the solution.

A capillary tube was filled with the monomer mixture by inserting one end of the capillary tube into a vial filled with the monomer mixture and applying a vacuum to the other end of the capillary. While the step of filling is described in terms of one capillary, a plurality of capillary tubes could be prepared simultaneously.

Subsequent to filling, the capillary was exposed to UV radiation ($\lambda \geq 365$ nm) for about 30 minutes to provide a total energy deposition of about 14 $J/cm^2$.

Immediately after the polymerization step, the capillary column was washed or purged with 2-methoxyethanol for a period of 12 hrs to remove all trace of unreacted monomer reagents. Purging the column with 2-methoxyethanol serves two purposes. First, to stop the polymerization process by removing any unreacted monomer. Second, to eliminate the possibility of precipitation of unreacted monomer due to mixing of the low polarity unreacted monomers with the high polarity acetic acid/acetonitrile mixture used in the step of acid hydrolysis.

To complete the synthesis of the polymer monolith material, acid hydrolysis of the trimethoxysilyl moieties was carried out by purging the column with a mixture of 50 vol % 0.35 M glacial acetic acid and 50 vol % acetonitrile for 12 hrs.

Finally, the hydrolysis solution was exchanged with a buffer solution consisting of about 30 vol % acetonitrile and about 70 vol % 20 mM borate solution (pH 8.0) for about 3 hrs.

A system similar to that described in EXAMPLE 1 was assembled and a solution containing 0.1 mg/ml of α-lactalbumin in acetonitrile/borate was injected onto the porous polymer monolith stationary phase described above. Injection of the sample was at a voltage of about 10 kV and a current of 4.2 μA, for a period of about 10 sec.

A detection window was created by irradiating a section of the polymer monolith with a frequency doubled argon ion laser (λ=257 nm, 0.220 W) for about three hours while purging the column with a buffer solution consisting of 20 mM borate, pH 8.0 (70 vol %) and acetonitrile (30 vol %). This treatment resulted in producing a 1–2 mm long polymer-free section for on-column detection.

Figure 3A:
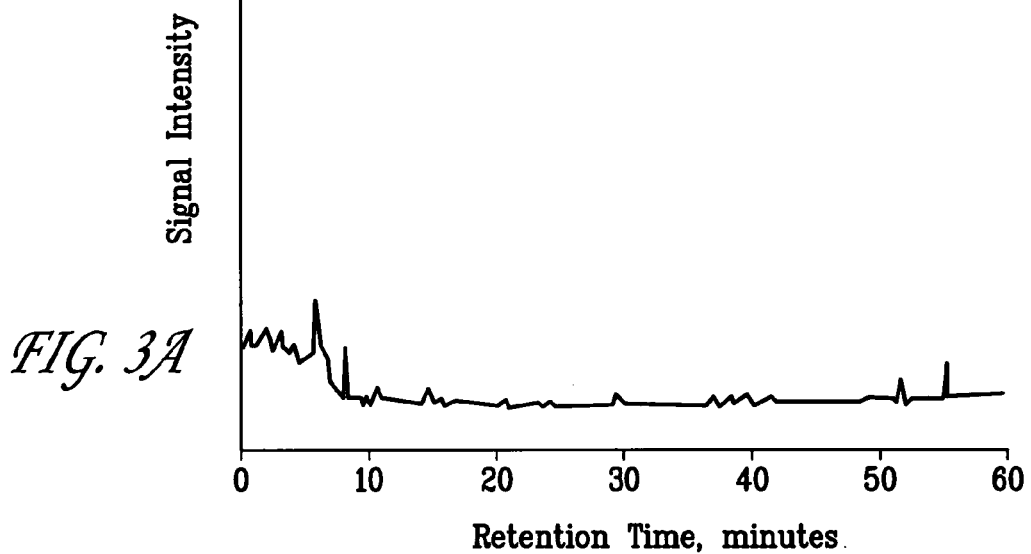
FIGS. 3a and 3b are chromatographs of α-lactalbumin under the influence of a voltage gradient (3a) and a pressure gradient (3b).
Figure 3B:
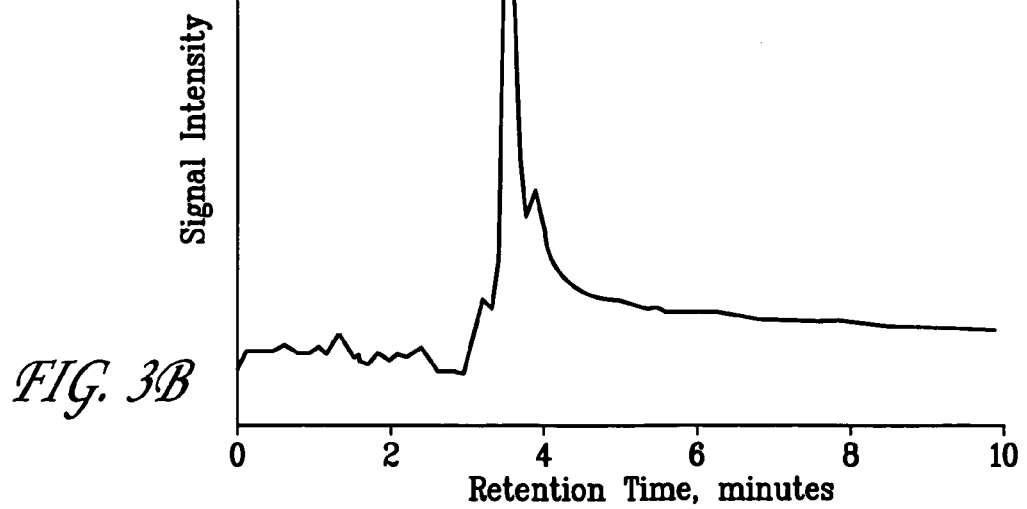

Referring now to FIG. 3a, which shows a chromatogram of the sample with a voltage of about 10 kV applied to the column, it can be seen there was no evidence of the α-lactalbumin eluting from the column even after a running time of 1 hr. However, at zero voltage and an applied pressure of about 1800 psi, a signal corresponding to α-lactalbumin was detected after about 4 min, FIG. 3b.

In both examples above, one solution was exchanged for another during the synthesis of the porous polymer monolith. The step of exchanging can be by application of hydraulic pressure or by the use of EOF (cf. prior co-pending application Ser. No. 09/603,466 entitled "Porous Polymer Media", incorporated herein by reference in its entirety).

As shown in the Example below, the ability of porous polymer monolith of the present invention to trap and retain charged protein species can provide means for concentrating charged protein species from a dilute solution. The retained species can be quantitatively released when the concentration has increased sufficiently for further processing by application of pressure.

EXAMPLE 3

A porous polymer monolith was prepared as the stationary phase in a capillary chromatography column as described in either of Examples 1 or 2 above. Ovalbumin was labeled with fluorescein isothiocyanate and dissolved in a mixture of 20 mM borate, pH 8.4, and 30 vol % acetonitrile to a concentration of about 0.5 mg/mL. Under these conditions the ovalbumin becomes charged. Following injection of the ovalbumin solution onto chromatography column, a voltage of about 10 kV was applied to the capillary column for about 20 minutes. Subsequently, the electric field strength was decreased and a pressure of about 1850 was applied to the chromatography column.

Figures 4A, 4B, 4C:
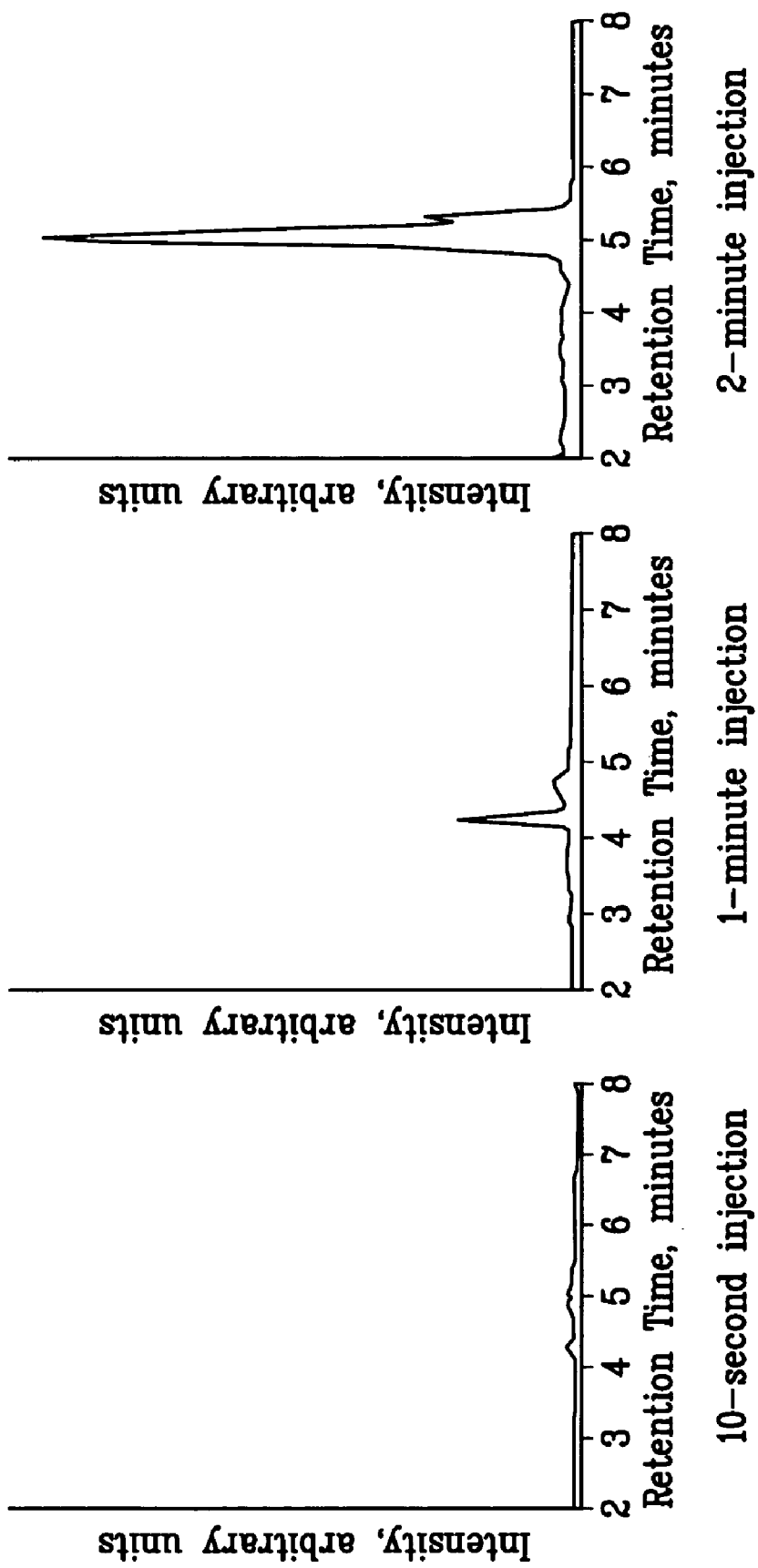
FIGS. 4a–c illustrate preconcentration effects.

Increasing quantities of ovalbumin were injected serially onto a porous polymer stationary phase as indicated by the increased solution injection times (e.g., 10, 60 and 120 sec). As before, none of the charged ovalbumin was eluted from the chromatography column during application of the electric field. Referring now to FIGS. 4a–c, it can be seen that application of pressure caused elution of the ovalbumin at between 4–5 minutes. These data show, as above, that charged proteins are retained on the porous polymer monolith during application of an electric field and are eluted from the polymer during subsequent application of pressure. Moreover, the increasing heights of the chromatographic peaks, and their relationship to one another, show that the injected ovalbumin was not only retained on the porous polymer stationary phase but also quantitatively eluted.

In summary, the present invention discloses and describes a method for preparing a three-dimensional microporous polymer network material, or monolith, that can be cast-to-shape in a microchannel. The polymer monolith produced by the invention is capable of 1) quantitatively and controllably removing and retaining charged protein species from a solution under the influence of an applied electric field and 2) releasing the retained charged protein species when subjected to a subsequent pressure-driven flow.

We claim:

1. A method for controllably retaining and releasing charged species contained in solution, comprising:
    a) passing the solution through a porous stationary phase disposed in a capillary column by imposing a voltage gradient between first and second ends of the column; and
    b) subsequently subjecting the capillary column to a pressure gradient between first and second ends of the column, wherein the porous stationary phase is comprised of a porous polymer monolith prepared by the method of;
    pretreating the internal surface of the capillary column;
    filling the capillary column with a solution comprising a monomer mixture and a solvent, wherein the monomer mixture comprises an alkoxy protected metal functionality, a crosslinker, and a polymerization initiator;
    polymerizing the monomer by exposing at least a portion of the mixture to radiation to form a porous polymer monolith;
    hydrolyzing the alkoxy functionalities by washing the polymer monolith with a hydrolyzing solution; and
    washing the hydrolyzing solution from the polymer monolith.

2. The method of claim 1, wherein said step of pretreating includes exposing the internal surface to an aqueous solution of acetic acid.

3. The method of claim 1, wherein the monomer mixture is a mixture of lauryl acetate, 1,6-hexyldiol diacrylate, and 3-(trimethoxy silyl)propylacrylate.

4. The method of claim 1, wherein the metal comprising the alkoxy protected metal functionality is Si, Ti or Zr.

5. The method of claim 1, wherein said step of polymerizing includes exposing the monomer solution to UV radiation.

6. The method of claim 1, wherein said step of hydrolyzing includes exposing the polymer monolith to a solution of acetic acid in acetonitrile.

7. The method of claim 1, further including the step of adding a polymerization inhibitor to improve resolution between irradiated and unirradiated regions of the monomer mixture.

8. The method of claim 1, further including the step of purging the solvent from the monolith prior to the step of hydrolysis.

9. The method of claim 1, wherein said step of pretreating includes exposing the internal surface to an aqueous solution of acetic acid and 3-(trimethoxy silyl)propylacrylate.

10. The method of claim 8, wherein said step of purging includes rinsing the polymer monolith with 2-methoxyethanol.

11. The method of claim 1 wherein at least 25 vol % of the monomer contains a hydrophobic group such as alkyl, aryl, or substituted versions thereof.

12. A method for treating a solution to separate charged species from uncharged species contained therein, comprising:
   a) passing the solution through a porous stationary phase disposed in a column by imposing a voltage gradient along the column, wherein the porous stationary phase is a porous polymer monolith produced by the method of claim 1; and
   b) subsequently subjecting the column to a pressure differential.

13. A method for chromatographic separation of protein species, comprising:
   passing a solution containing species to be separated through a porous stationary phase disposed in a column by imposing a voltage gradient along the column, where in the porous stationary phase is produced by the method of claim 1.

* * * * *